(12) United States Patent
Sun et al.

(10) Patent No.: US 8,859,895 B2
(45) Date of Patent: Oct. 14, 2014

(54) METHOD FOR VERTICALLY GROUNDING AND LEADING DOWN FROM CENTER OF COMPOSITE POLE TOWER AND POLE TOWER THEREOF

(75) Inventors: Zhusen Sun, Wuhan (CN); Qiang Zhang, Wuhan (CN); Minghua Li, Wuhan (CN); Zhijun Li, Wuhan (CN); Ting Liu, Wuhan (CN); Feng Huo, Wuhan (CN); Min Dai, Wuhan (CN); Kai Liu, Wuhan (CN); Xiong Wu, Wuhan (CN); Dingxie Gu, Wuhan (CN); Peihong Zhou, Wuhan (CN); Ying Lou, Wuhan (CN); Zhenqiang Li, Wuhan (CN); Huiwen He, Wuhan (CN)

(73) Assignee: State Grid Electric Power Research Institute, Hubei, Wuhan (CN)

( * ) Notice: Subject to any disclaimer, the term of this patent is extended or adjusted under 35 U.S.C. 154(b) by 183 days.

(21) Appl. No.: 13/395,112

(22) PCT Filed: May 5, 2010

(86) PCT No.: PCT/CN2010/072457
§ 371 (c)(1),
(2), (4) Date: Mar. 8, 2012

(87) PCT Pub. No.: WO2011/029312
PCT Pub. Date: Mar. 17, 2011

(65) Prior Publication Data
US 2012/0168192 A1 Jul. 5, 2012

(30) Foreign Application Priority Data

Sep. 8, 2009 (CN) .......................... 2009 1 0063895
Jan. 28, 2010 (CN) .......................... 2010 1 0116857

(51) Int. Cl.
| H02G 13/00 | (2006.01) |
| H01R 4/66 | (2006.01) |
| H02G 7/20 | (2006.01) |
| H02G 3/04 | (2006.01) |

(52) U.S. Cl.
CPC ............. *H02G 7/205* (2013.01); *H02G 3/0481* (2013.01)
USPC ........................ 174/2; 174/3; 174/6; 174/45 R

(58) Field of Classification Search
USPC ......................................... 174/2, 3, 4, 6, 45 R
See application file for complete search history.

(56) References Cited

U.S. PATENT DOCUMENTS

| 357,050 A * | 2/1887 | Vail ............................... 361/117 |
| 1,744,353 A * | 1/1930 | Austin ........................... 361/132 |
| 2,721,362 A * | 10/1955 | McCoy et al. .................. 174/43 |

(Continued)

*Primary Examiner* — Timothy Thompson
*Assistant Examiner* — Sherman Ng
(74) *Attorney, Agent, or Firm* — Raymond Y. Chan; David and Raymond Patent Firm

(57) ABSTRACT

A method for vertically grounding and leading down form a center of a composite pole tower includes the following steps: extending a ground down-leading wire from a center of a ground wire cross arm which is made of metal and is positioned on top of the pole tower, wherein the ground down-leading wire is vertically leaded down to the earth form the center of the composite pole tower, wherein when an lower portion of the tower body is a metal pipe, the ground down-leading wire is extended from the center of the composite material and is directly connected to the metal pipe. The method utilizes the advantage of the insulating intensity of the wall of the composite pole tower and enhances the insulating intensity of the transmission line on impact of lightning. The ground down-leading wires are prevented from short-circuiting with the tower body of the composite pole tower, so that advantage of the insulating property of the composite material of the pole towers is realized. Since the ground down-leading wire is penetrated through center of the pole tower, so that the ground down-leading wires are not exposed and are prevented from destroying by external force. And also the method is easy and simple for application.

16 Claims, 5 Drawing Sheets

(56) References Cited

U.S. PATENT DOCUMENTS

| | | | |
|---|---|---|---|
| 3,509,678 A * | 5/1970 | Dake | 248/218.4 |
| 3,884,442 A * | 5/1975 | Breeden et al. | 211/107 |
| 3,935,689 A * | 2/1976 | Bladholm et al. | 52/223.8 |
| 5,043,527 A * | 8/1991 | Carpenter, Jr. | 174/2 |
| 7,002,079 B2 * | 2/2006 | Mitchell et al. | 174/140 C |
| 2002/0070039 A1 * | 6/2002 | Brammer | 174/3 |
| 2005/0178570 A1 * | 8/2005 | King et al. | 174/45 R |
| 2008/0020655 A1 * | 1/2008 | Rizk et al. | 439/894 |

\* cited by examiner

METHOD FOR VERTICALLY GROUNDING AND LEADING DOWN FROM CENTER OF COMPOSITE POLE TOWER AND POLE TOWER THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention is in a field related to application of electricity transmission technology of an electric power system. And more particularly, the present invention relates to a method for vertically grounding and leading down form a center of a composite pole tower and pole tower thereof.

2. Description of Related Arts

Pole towers are important instruments in an electric transmission line. The property of material of pole powers has a direct influence on safety, economy, and reliability of operation of the electric transmission line. Since raw steel material has a high intensity and good weight ratio, pole powers of high voltage electric transmission line at home and abroad are mostly made of raw steel material. However, pole powers of raw steel material also have disadvantages such as being massive (density of the raw steel material is high) and easy to corrupt. And thus a lot of manpower and materials are required for construction, transport and maintenance of the pole towers. With the development of the composite materials, advantages such as light weight, high intensity, corrosion-resistant, bearable in high temperature and low temperature, durable, and good insulating property have been found in composite materials. Therefore, poles powers of composite material, which have advantages such as low cost of transporting (especially in a sparsely populated area), antifouling, corrosion-resistant and the like, have good utilization prospects. It should be noted that pole towers of composite material have already been widely used in some areas in Canada and America.

However, lightning protection is not an issue when the pole towers of composite material are used in Canada and America. The mainly reason is that these areas using pole towers of composite material do not suffered a lot from lightning (For these areas in Canada and America have long winters, and lightning days are very few). Furthermore, the electric transmission lines are of low voltage which is mostly lower than 110 kv and do not required grounding. In addition, influence of lightning on the system is not vital because the voltage is relatively low.

Recently, pole towers in China are made of reinforced concrete, wood or raw steel (a pole tower in the rank of high voltage which is more than 110 kv often is made of raw steel). Because of the outstanding property of composite material, many regions in China also begins to use composite material (for pole towers in the rank of high voltage which are more than 110 kv). However, in these regions of China, issues such as much efforts have been put on building the transmission corridor, lightning takes place frequently, and contamination should be concerned, so that when the pole towers of composite material are employed to these regions, focus should be put on reducing a width of the transmission corridor (reduce the maximum distance between the leads of the transmission line), avoiding damage by lightning (reduce the possibility of destroy by lightning), and preventing contamination (reduce the possibility of running out of order because of pollution flashover by increasing a climbing distance of the pollution flashover).

In order to prevent the pole towers from damage by lightning, ground wires should be installed to the transmission line (the pole towers in Canada and America have not been provided with ground wires because it is not a issue in these regions of these countries). The pole towers of composite material should be grounded to release lightning energy of the ground wires (lightning conductor) or tower peak during lightning so as to increase ability lightning protection of the pole towers.

Therefore, in a region in which lightning takes place frequently, grounding should be carefully taken in consideration when pole towers of composite material are applied in use (since the body itself of a steel pole tower is a metal conductor, ground wires are directly electrically connected to the earth through the body of the pole tower, so that grounding is not an issue for a steel pole tower). There are several kinds of grounding and leading-down methods which directly have influence on performance of lightning protection, reducing the width of the transmission line and contamination prevention, so that methods of grounding and leading-down are important and key issues that should be solved when the pole towers of composite material are in application.

SUMMARY OF THE PRESENT INVENTION

A main object of the present invention is to provide a method for vertically grounding and leading down form a center of a composite pole tower and pole tower thereof, so that advantage of the insulating property of the composite material of the pole towers is realized, and the present invention further has advantages such as reducing the width of transmission corridor and preventing damage by lightning and contamination by pollution flashover.

Additional advantages and features of the invention will become apparent from the description which follows, and may be realized by means of the instrumentalities and combinations particular point out in the appended claims.

According to the present invention, the foregoing and other objects and advantages are attained by a method for vertically grounding and leading down form a center of a composite pole tower, wherein the method comprises the following steps: extend a ground down-leading wire from a center of a ground wire cross arm which is made of metal and is positioned on top of the pole tower, wherein the ground down-leading wire is vertically leaded down to the earth form the center of the composite pole tower, wherein when an lower portion of the tower body is a metal pipe, the ground down-leading wire is extended from the center of the composite material and is directly connected to the metal pipe which is the lower portion of the tower body.

Preferably, in the above method, the ground down-leading wire is coated with a layer of insulating material to enhance insulating property between the ground down-leading wire and current lead.

Preferably, in the above method, a connecting member which is made of insulating material is provided for connecting and supporting a composite insulator.

Preferably, in the above method, a flashover spot, which is at a position under a current lead, is provided on the tower body of tower head.

In accordance with another aspect of the invention, the present invention provides a composite pole tower which grounds from a center thereof, wherein the pole tower comprises a ground cross arm, which is made of metal, positioned on top of the pole tower, a ground down-leading wire extended from a center of the ground wire cross arm, wherein the ground down-leading wire is vertically leaded down to the earth form the center of the composite pole tower, wherein when an lower portion of the tower body is a metal pipe, the ground down-leading wire is extended from the center of the composite pole tower and is directly connected to the metal pipe which is the lower portion of the tower body.

Preferably, in the above composite pole tower, the ground down-leading wire is coated with a layer of insulating material to enhance insulating property between the ground down-leading wire and current lead.

Preferably, in the above composite pole tower, a connecting member which is made of insulating material is provided for connecting and supporting a composite insulator.

Preferably, in the above composite pole tower, a flashover spot, which is at a position under a current lead, is provided on the tower body of tower head.

The present invention has following advantages.

Firstly, the insulating property of the wall of the composite pole tower is made use of to enhance the insulating intensity of the transmission line on impact of lightning.

Secondly, by providing flashover spots, when the transmission line is impacted by lightning, the route of the flashover is from the current lead to the flashover spots, so that burning and damage to the wall of the composite pole tower during lightning are prevented.

Thirdly, preventing the ground down-leading wire from short-circuiting with the tower body of the composite pole tower, so that advantage of the insulating property of the composite material of the pole towers is realized, and distance of the current lead climbing from the earth is increased, so that the ability of avoiding influence of pollution flashover is enhanced.

Fourthly, the ground down-leading wires are not pulled out to be at a position above surface of the earth, so that inconvenience to daily life of people is prevented.

Fifthly, the ground down-leading wires are not exposed and are prevented from destroying by external force such as wind power. The structure is simple and easy to achieve.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
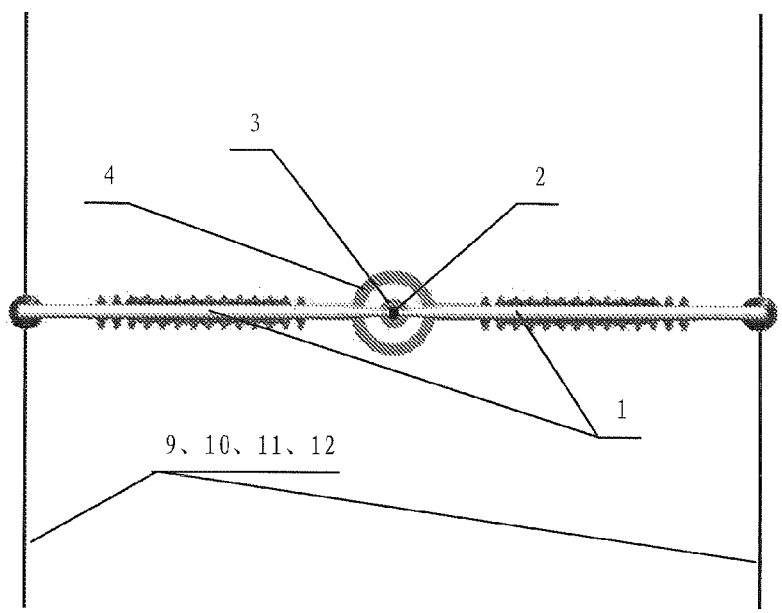
FIG. 1 is a front view of a pole tower according to a preferred embodiment of the present invention.
Figure 2:
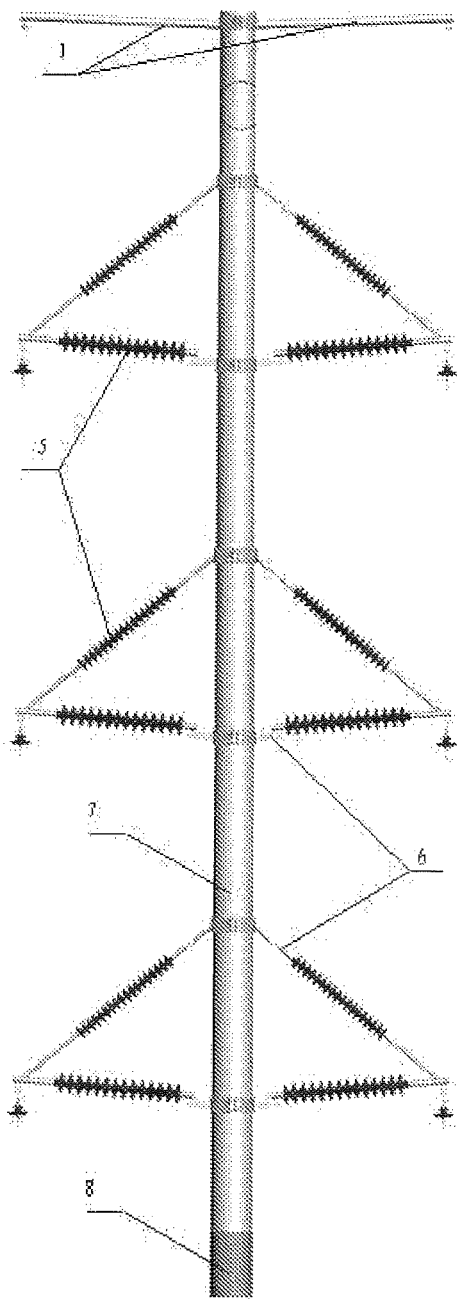
FIG. 2 is a perspective view of a pole tower without flashover spots according to the above preferred embodiment of the present invention.
Figure 3:
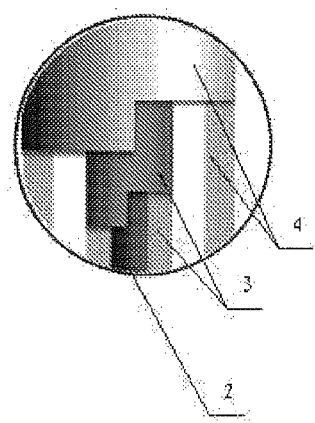
FIG. 3 is an enlarged view of the pole tower in FIG. 2.
Figure 4:
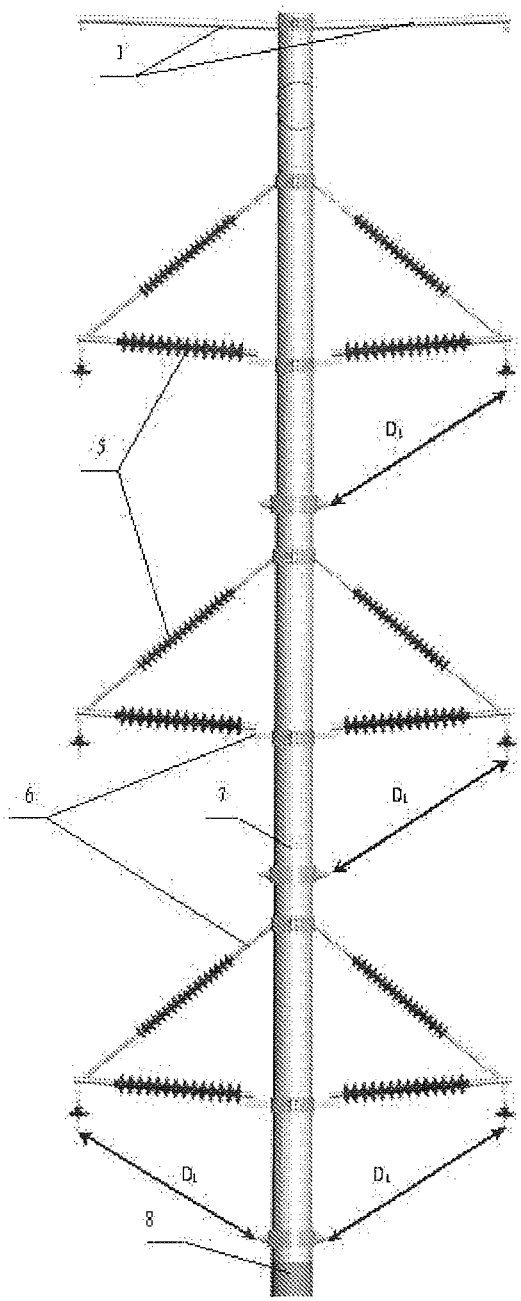
FIG. 4 is a perspective view of a pole tower with flashover spots according to a second preferred embodiment of the present invention.
Figure 5:
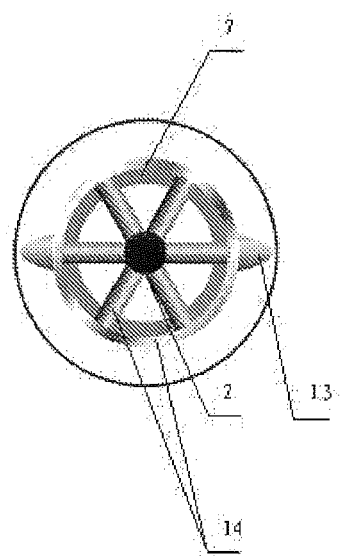
FIG. 5 is an enlarged view of flashover spots in FIG. 4.

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Illustration of the symbols: 1—ground wire cross arm, 2—ground down-leading wire, 3—insulating layer of the ground down-leading wire, 4—insulating layer of wall of the pole tower, 5—composite insulator, 6—connecting member for connecting and supporting the composite insulator, 7—body of tower head, 8—lower portion of the tower body, 9—ground wire, 10—upper current lead, 11—middle current lead, 12—lower current lead, 13—flashover spot, 14—coupling member for electrically connecting the flashover spot and the ground down-leading wire.

The present invention provides a pole tower which grounds from a center thereof, the pole tower comprises: a ground cross arm 1, which is made of metal, positioned on top of the pole tower, and a ground down-leading wire 2 extended from a center of the ground wire cross arm 1, wherein the ground down-leading wire 2 is vertically leaded down to the earth form the center of the composite pole tower, wherein when an lower portion of the tower body 8 is a metal pipe, the ground down-leading wire 2 is extended from the center of the composite pole tower and is directly connected to the metal pipe which is the lower portion of the tower body.

Since the body of tower head 7, which is made of composite material, has insulating intensity to some extent, so that when the ground down-leading wire 2 is vertically leaded down to the earth form the center of the composite pole tower, the insulating intensity of wall of the composite tower is made use of to enhance insulating intensity of the transmission line on impact of lightning. Accordingly, the enhancing effect has nothing to do with the property and size of the composite material. Furthermore, because the body of tower head is made of composite material, the ground down-leading wire 2 is prevented from short-circuiting with the tower body of the composite pole tower, so that distance of the current lead climbing from the earth is increased, so that the ability of avoiding influence of pollution flashover is enhanced.

By providing flashover spots, when the transmission line is impacted by lightning, the route of the flashover is from the current lead to the flashover spots, so that burning and damage to the wall of the composite pole tower during lightning are prevented. The flashover spots 13 are at a position under a current lead, wherein the position is determined by factors such as insulating intensity of wall of the composite pole tower, insulating intensity of the insulating layer coated on the ground down-leading wire, insulating intensity of the connecting member which is used for connecting and supporting a composite insulator. Selection of position of the flashover spots mainly concern two issues: the distance between the current lead and the flashover spot should be long enough, and ensuing that when flashover is taking place during lightning, the electricity discharge is from the current lead to the flashover spots rather than puncturing the wall of the pole tower to discharge electricity to the ground down-leading wire.

An insulating layer may be coated on the ground down-leading wire 2. A connecting member 6, which is made of insulating material, is used for connecting and supporting the composite insulator. And thus an insulating distance from the current lead to the earth is increased, so that the insulating intensity of the transmission line on impact of lightning is enhanced.

Since the ground down-leading wire 2 the ground down-leading wire 2 is vertically leaded down to the earth form the center of the composite pole tower, so that the ground down-leading wires are not exposed and are prevented from destroying by external force such as wind power. The ground down-leading wires are not pulled out to be at a position above surface of the earth, so that inconvenience to daily life of people is prevented.

The method for grounding of the pole tower of composite pole tower of the present invention is simple and easy to achieve.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for vertically grounding and leading down from a pole tower, comprising the steps of:
   (a) configuring said pole tower to have an insulated tower head extended from the ground and a metal made ground wire cross arm formed on top of said pole tower, wherein at least a current lead is supported by said insulated tower head of said pole tower;
   (b) extending a ground down-leading wire from a center of said ground wire cross arm to the earth through said pole tower, wherein said ground down-leading wire is vertically leaded down at a center of said pole tower to the earth, so as to insulate said ground down-leading wire by said insulated tower head.

2. The method, as recited in claim 1, further comprising the steps of:
   (c) providing at least a flashover spot at said insulated tower head of said pole tower at a position under said current lead at said ground wire cross arm; and
   (d) providing at least a coupling member for electrically connecting said flashover with said ground down-leading wire at the center of said pole tower.

3. The method, as recited in claim 1, wherein the step (a) further comprising a step of providing a metal made lower tower body of said pole tower in the ground, wherein, in the step (b), said ground down-leading wire is vertically leaded down at the center of said pole tower to connect to said lower tower body.

4. The method, as recited in claim 2, wherein the step (a) further comprising a step of providing a metal made lower tower body of said pole tower in the ground, wherein, in the step (b), said ground down-leading wire is vertically leaded down at the center of said pole tower to connect to said lower tower body.

5. The method, as recited in claim 1, wherein said ground down-leading wire is coated with a layer of insulating material to enhance insulating property between said ground down-leading wire and said current lead.

6. The method, as recited in claim 4, wherein said ground down-leading wire is coated with a layer of insulating material to enhance insulating property between said ground down-leading wire and said current lead.

7. The method, as recited in claim 1, further comprising a step of providing a connecting member which is made of insulating material for connecting and supporting a composite insulator.

8. The method, as recited in claim 6, further comprising a step of providing a connecting member which is made of insulating material for connecting and supporting a composite insulator.

9. A pole tower, comprising:
   an insulated tower head for extending from the ground and for supporting at least a current lead;
   a metal made ground wire cross arm formed on top of said insulated tower head; and
   a ground down-leading wire extended from a center of said ground wire cross arm to the earth through said insulated tower head, wherein said ground down-leading wire is vertically leaded down at a center of said insulated tower head to the earth, so as to insulate said ground down-leading wire by said insulated tower head.

10. The pole tower, as recited in claim 9, further comprising at least a flashover spot provided at said insulated tower head at a position under said current lead at said ground wire cross arm, and at least a coupling member for electrically connecting said flashover with said ground down-leading wire at the center of said insulated tower head.

11. The pole tower, as recited in claim 9, further comprises a metal made lower tower body extended from said insulated tower head, wherein said ground down-leading wire is vertically leaded down at the center of said insulated tower head to connect to said lower tower body.

12. The pole tower, as recited in claim 10, further comprises a metal made lower tower body extended from said insulated tower head, wherein said ground down-leading wire is vertically leaded down at the center of said insulated tower head to connect to said lower tower body.

13. The pole tower, as recited in claim 9, wherein said ground down-leading wire is coated with a layer of insulating material for enhancing insulating property between said ground down-leading wire and said current lead.

14. The pole tower, as recited in claim 12, wherein said ground down-leading wire is coated with a layer of insulating material for enhancing insulating property between said ground down-leading wire and said current lead.

15. The pole tower, as recited in claim 9, further comprising a connecting member which is made of insulating material for connecting and supporting a composite insulator.

16. The pole tower, as recited in claim 14, further comprising a connecting member which is made of insulating material for connecting and supporting a composite insulator.

* * * * *